May 27, 1969

D. A. WEUM 3,446,242

WATER FLOW REGULATING AND WARNING SYSTEM

Filed May 13, 1966

INVENTOR.
DALE A. WEUM
BY
Merchant & Gould
ATTORNEYS

United States Patent Office 3,446,242
Patented May 27, 1969

3,446,242
WATER FLOW REGULATING AND WARNING SYSTEM
Dale A. Weum, Minneapolis, Minn., assignor to Red Owl Stores, Inc., Hopkins, Minn., a corporation of Delaware
Filed May 13, 1966, Ser. No. 549,890
Int. Cl. F16k 37/00
U.S. Cl. 137—557         5 Claims

ABSTRACT OF THE DISCLOSURE

An elongated tubular restricting member having a radially outwardly flared inlet opening and a beveled or radially outwardly tapered outlet opening at the opposite end, mounted coaxially within a water carrying conduit by an imperforate mounting member to restrict the flow of water through the conduit to a predetermined amount while reducing the fouling of the inlet end by foreign objects and mineral deposits and the like at the outlet end to a minimum. Further, the system includes two such regulating devices mounted within a conduit in axially spaced apart relationship to form a chamber therebetween with a pressure sensitive device therein to indicate any reduction in flow beyond the predetermined amount.

---

In relatively large refrigeration systems for food stores and the like it is common to utilize a water circulating system to cool the gas in refrigerant condensers. In this water circulating system a water tower or other large tank is erected in which water is constantly evaporated to maintain the circulating water at a predetermined temperature. As the water in the tank constantly evaporates the minerals and other impurities remain in the solution and eventually a very high percentage of the material in the tank is impurities. To maintain the impurities and the water in the tank at or below a ratio which is not harmful to the system, a small amount of the water and the impurities contained therein is constantly bled from the tank to a drain. As the impure water is bled from the tank fresh water is supplied to the tank to maintain the liquid therein at a desired level. By adjusting the amount of water leaving the tank and the amount of water entering the tank the impurities in the tank can be maintained below the level at which they would become harmful to the system.

In the prior art the flow of water entering the tank and the flow of water leaving the tank are regulated by simple valves or in some cases by simply restricting the conduits carrying the water. In some prior art devices the conduit through which a portion of the water is bled to the drain is restricted by simply pinching the end partially shut. In general all of the prior art devices for restricting the flow of water through the conduits cause the impurities in the water to settle at the restriction, which settling eventually has a tendency to cause a build-up of impurities at the restriction and eventual plugging of the restriction. If the flow of water in the fresh water supply line or the bleed line is stopped by impurities the entire water cooling system can eventually be rendered inoperative.

In the present invention a novel water flow regulating device is provided, which device is capable of restricting the flow of water to any desired amount. The water flow regulating device is designed so that there is no build-up of impurities at the restricting orifice and, in addition, it is easily disassembled so that it can be cleaned in the event of excessively large particles collecting therein, and so that the restriction can be changed to vary the flow of water. As a further advantage an indicating device is associated with the water flow regulating device to indicate a variation in the amount of water flowing therethrough. By indicating when the amount of the water flowing through the regulating device has decreased an operator can be warned in advance of impending difficulties. Thus, utilizing the present invention, a water system is provided which requires very little or no attention from an operator. Whereas the prior art water flow regulating devices have to be cleaned or replaced periodically the present device remains virtually free from deposits of foreign materials and, in the event an excessively large particle plugs the device or impedes the flow of water therethrough, the warning device signals the operator.

It is an object of the present invention to provide a new and improved water flow regulating device.

It is a further object of the present invention to provide a water flow regulating device which is virtually free from the depositing of foreign materials therein.

It is a further object of the present invention to provide an indicating device which produces a signal for an operator when the flow of water through the regulating device is impeded.

These and other objects of this invention will become apparent to those skilled in the art upon consideration of the accompanying specification, claims and drawings.

Referring to the drawings, wherein like characters indicate like parts throughout the figures.

Figure 1:
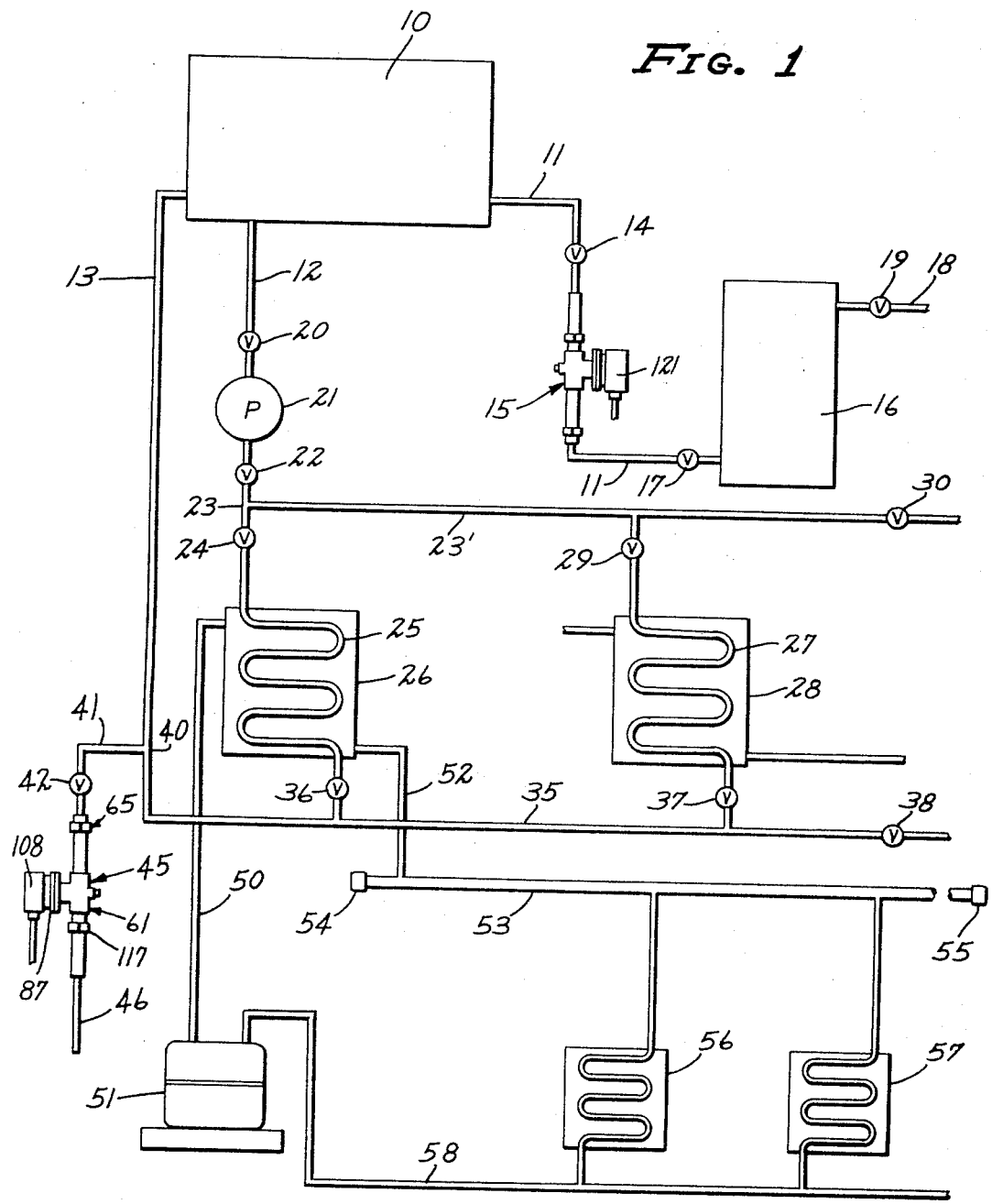
FIG. 1 is a somewhat schematic view of a water circulating system for a refrigeration unit including the present invention.

Referring to FIG. 1 the numeral 10 indicates a water tank, which may be a water tower or any other device having means therein for evaporating water to maintain a supply of water at a given temperature. No detailed illustrations of the tank 10 are included because it does not form a part of this invention and is simply illustrated so that an entire water circulating system may be shown. The tank 10 has three water conveying conduits 11, 12 and 13 operatively attached thereto. Conduit 11 extends from the tank 10 to a valve 14 and from the valve 14 to a water flow regulating and warning device generally designated 15. The conduit 11 extends from the regulating and warning device 15 to the outlet of a water treatment tank 16 and has a second valve 17 interposed therebetween. A conduit 18 leading from a source of fresh water is attached to the inlet of the water treatment tank 16 and has a valve 19 therein. The valves 14, 17, and 19 will not be discussed in detail since they are simple utilized to close off the flow of water during maintenance of the system. Thus, water flows from the supply through the conduit 18 the water treatment tank 16 and the conduit 11, including the regulating and warning device 15, into the tank 10.

The conduit 12 operatively attached to the tank 10 has a valve 20 interposed therein and is connected to the inlet of a pump 21. The outlet of the pump 21 is connected through a valve 22 to one branch of a T-junction 23. The other arm of the T-junction 23 is connected through a valve 24 to the inlet of a cooling coil 25 disposed in a refrigerant condenser 26. The body of the T-junction 23 is attached to, or forms a part of, a header 23' which may extend as far as desirable and generally terminates, not shown, by simply capping the end or by connecting the end to a cooling coil similar to 25. The inlet of a second cooling coil 27 disposed in a refrigerant condenser 28 is attached to the header 23' through a valve 29 simply to illustrate the manner in which a plurality of cooling coils are attached to the header 23'. A valve 30 is disposed in the header 23' for maintenance purposes.

The outlets of the cooling coils 25 and 27 are attached to a return line 35 through valves 36 and 37 respectively. The end of the return line 35 is not illustrated to indicate that the line may be as long as desirable, however, a valve 38 is interposed therein for maintenance purposes. The return line 35 is connected to one arm of a T-junction 40 and the conduit 13 operatively attached to the tank 10 is connected to the second arm thereof. A conduit 41 is connected to the body of the T-junction 40. The conduit 41 has a valve 42 interposed therein and is operatively attached to the inlet of a regulating and warning device 45. The outlet of the regulating and warning device 45 is connected through a conduit 46 to a drain, not shown.

A typical refrigeration system, which may be attached to the above described water circulating system, is connected as follows. The refrigerant inlet of the condenser 26 is operatively attached to a conduit 50 the other end of which is attached to the outlet of a compressor 51. The refrigerant outlet of the condenser 26 is operatively attached to a conduit 52 the other end of which is attached to a refrigerant header or main conduit 53. The refrigerant header 53 is capped at either end 54 and 55 and has the inlets for the cooling coils of a plurality of refrigeration units 56, 57, etc. operatively attached thereto, by some means such at T-joints or the like. The outlets of the cooling coils in the refrigeration units 56, 57, etc., are operatively attached to a return line 58, by some means such as T-joints or the like. The return line 58 may terminate, not shown, in the outlet of a refrigeration unit or it may simply be capped in a manner similar to the header 53. The other end of the return line 58 is operatively attached to the inlet of the compressor 51. It should be understood that the refrigeration system described is simply for illustrative purposes and is not intended to limit the scope of this invention in any way.

In the operation of the water circulating system the tank 10 maintains a supply of water approximately at a predetermined temperature by means of evaporation or the like. This supply of water is circulated by pump 21 into the header 23' and from there through the cooling coils 25, 27, etc. to the return line 35. The water in the return line 35 is forced through the conduit 13 back into the tank 10 where it is recooled. Because water is constantly evaporating from the tank 10 to maintain the water therein at a predetermined temperature, minerals and foreign material, which will not evaporate, accumulate in the tank 10 until they hamper and even prevent the circulation of the water through the circulating system. To prevent this large accumulation of foreign materials the conduit 41, regulating and warning device 45 and conduit 46 provide a path to a drain or the like through which a predetermined amount of water can flow. This flow or bleed-off of water to the drain carries with it a sufficient amount of the impurities to prevent them from accumulating to a quantity which would be harmful to the system. As the water level in the tank 10 is lowered through evaporation and the bleed-off of impurities to the drain, the water is replenished from a source through the conduit 18, water treatment tank 16 and the conduit 11, which contains the regulating and warning device 15. Thus, water is constantly circulated through the cooling coils 25, 27 etc. to operate the condensers in the refrigeration system.

Figure 2:
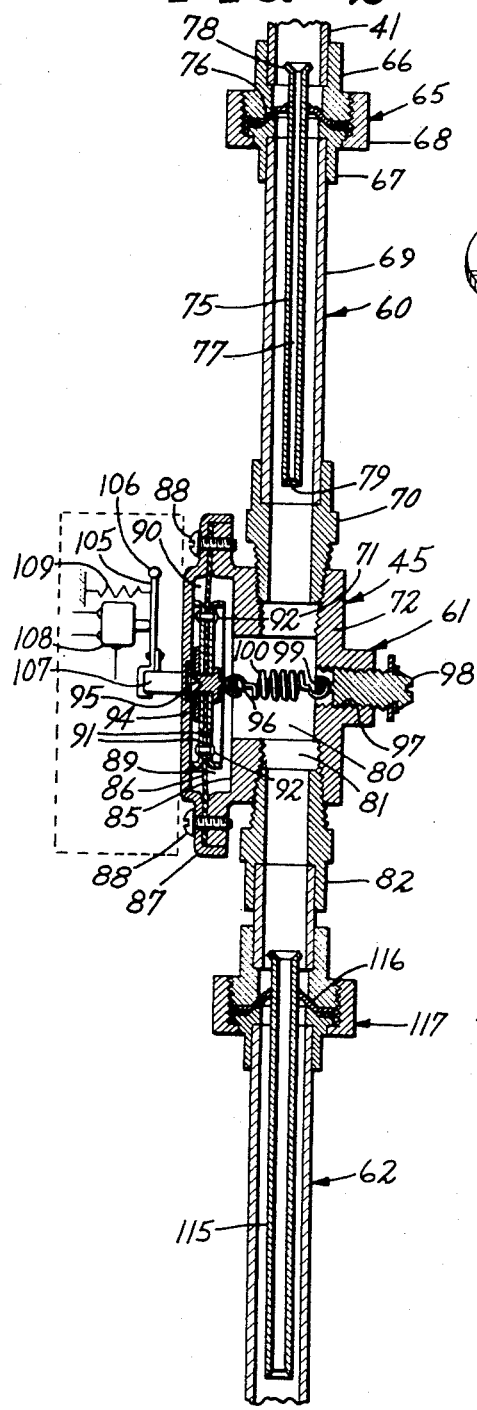
FIG. 2 is an axial sectional view, partially in schematic form, of the present water flow regulating device and associated warning system.

The regulating and warning devices 15 and 45, illustrated in FIG. 1, are each substantially similar and vary only in the amount of water they allow to flow therethrough. An enlarged view of an axial cross-section of the regulating and warning device 45 is illustrated in FIG. 2. The regulating and warning device 45 consists of a first water flow regulating device generally designated 60, a pressure responsive or sensing device generally designated 61 and a second water flow regulating device generally designated 62. The first water flow regulating device 60 includes a union 65 having a pair of axial abutting sleeves 66 and 67 with a coupler 68 rotatably engaged over the sleeve 67 and adapted to be threadedly engaged with the sleeve 66. The sleeve 66 has the end of the conduit 41 fixedly engaged therein by some means such as soldering or the like. One end of a relatively short piece of conduit 69 is fixedly attached in the sleeve 67, by some means such as soldering or the like, while the other end is fixedly engaged in an adapter 70, by some means such as soldering or the like. The adapter 70 has exterior threads thereon and is adapted to be engaged in a radial opening 71 in a housing 72 of the pressure responsive device 61.

Figure 3:
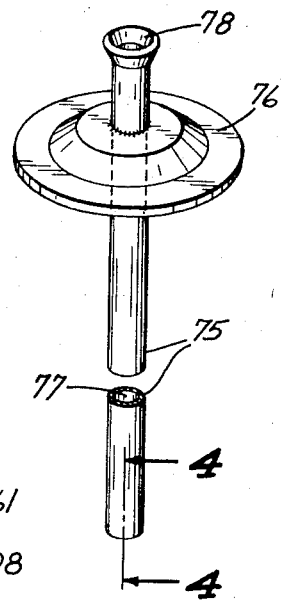
FIG. 3 is an enlarged view in perspective of a water flow regulating device.
Figure 4:
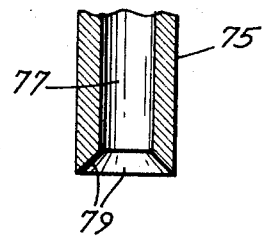
FIG. 4 is an enlarged sectional view as seen from the line 4—4 in FIG. 3.

The union 65, conduit 69 and adapter 70 form a straight flow path for water from the conduit 41 to the pressure responsive device 61. An elongated tubular member 75 is disposed coaxially within the flow path. The tubular member 75 has a plate-like flange 76 radiating outwardly from the outer periphery thereof adjacent the input end. The plate-like flange 76 is constructed to be engaged between the abutting sleeves 66 and 67 of the union 65. The diameter of the flange 76 is such that it extends outwardly between the sleeves 66 and 67 to maintain the tubular member 75 fixedly in place when the coupler 68 is threadedly engaged over the sleeve 66. In addition, the flange 76 completely blocks the flow of water through the union 65 except for a passageway 77 which extends axially through the tubular member 75. The diameter of the passageway 77 is chosen so that the flow of water therethrough is restricted to a desired amount. As illustrated in FIGS. 2 and 3 the inlet end of the tubular member 75 is flared outwardly at 78 to more readily admit or direct water into the passageway 77. Thus, any elongated pieces of foreign substance will be directed axially into the tubular member 75 and will be less likely to obstruct the passageway 77. As illustrated in FIGS. 2 and 4 the outlet end of the tubular member 75 is beveled at 79 so the inner surface tapers outwardly to join the outer surface of the tubular member 75.

Thus, the first regulating device 60 restricts the flow of water being bled from the water circulating system through the conduit 41 to a desired amount. The tubular member 75 and the flange 76 fixedly attached thereto are easily exchanged for a tubular member having a passageway 77 therethrough with a larger or smaller diameter to allow more or less water to be bled from the water circulating system. Also, the tubular member 75 may be quickly and easily removed for cleaning. The beveled outlet at 79 in the tubular member 75 is designed to prevent a build-up of foreign particles, which build-up tends to hamper or prevent the flow of water through the passageway 77. By constructing the tubular member 75 as illustrated the force of the water passing through the passageway 77 maintains the passageway 77 free and clear of deposits of foreign materials.

It should be understood that the pressure responsive device 61, which will be described in detail presently, is not intended to limit the scope of this invention and any pressure responsive device or flow indicating device accurate enough to indicate an undesirable reduction in the flow of water through the first regulating device 60 could be used. The pressure responsive device 61 has a generally cylindrical shaped housing 72 with an axial opening 80 therein. The radial opening 71 is in communication with the axial opening 80 and radiates outwardly therefrom approximately in the center of the housing 72. A second radial opening 81 in communication with the axial opening 80 radiates outwardly therefrom and is positioned approximately 180° from the radial opening 71 about the axis of the housing 72. The radial opening 71 is internally threaded to receive the adapter 70 and the radial opening 81 is internally threaded to receive an adapter 82, which is a part of the second water flow regulating device 62.

The left surface of housing 72, as seen in FIG. 2, has a generally cylindrical depression 85 therein which is coaxial and in communication with the axial opening 80 but has a substantially larger radius. A resilient diaphragm 86 having a diameter somewhat larger than the diameter of the depression 85 in the left face of the housing 72, is coaxially positioned over the depression 85 and held in position by a generally concave non-magnetic cover 87. Cover 87 is fixedly attached to the housing 72 by some means such as screws 88 or the like. Thus, the cover 87 and the housing 72 form a water-tight opening therebetween which is separated by the diaphragm 86 into a first chamber 89 in communication with the axial opening 80, and a second chamber 90.

A shallow cup-like member 91 is fixedly attached to either side of the diaphragm 86 by rivets 92 or the like to limit the axial movement of the diaphragm 86. Each of the cup-like members 91 have a central hole therethrough coaxial with a similar hole through the diaphragm 86. A washer 94 constructed of magnetic material and having a hole therein with a diameter slightly larger than the diameter of a rivet 95 is positioned against the outer surface of the cup 91 adjacent the cover 87. The entire assembly, cup members 91, diaphragm 86 and washer 94, is held together by rivet 95. Rivet 95 has a hook-like projection 96 extending outwardly from one end thereof slightly into the axial opening 80.

The right end of the housing 72 has an internally threaded axial hole 97 therein which is in communication with the right end of the axial opening 80. An insert 98, which may be a set screw or the like, is threadedly engaged in the axial hole 97 for limited axial movement. The insert 98 has a hook-like projection 99 extending from the inner end thereof toward the axial opening 80. A torsion spring 100 is engaged between the hook-like projections 96 and 99 to provide a bias on diaphragm 86 tending to move it toward the axial opening 80. The insert 98 provides an adjustment for varying the bias on the diaphragm 86 and, thus, the amount of water pressure which will effect it.

In the indicating apparatus an arm 105 is pivotally mounted at one end 106 and has a magnet 107 attached to the other end thereof. A push button switch 108 is positioned with its push button adjacent the arm 105 so that clockwise movement of the arm 105 about the pivotal mounting 106 will cause the switch 108 to close and counterclockwise movement will cause the switch 108 to open. A spring 109 is attached to the arm 105 and biases the arm 105 in a clockwise direction against the button of the switch 108. The magnet 107 at the end of the arm 105 is positioned so that it is in abutment with the cover 87 at approximately its center when the arm 105 is in its extreme counterclockwise portion and the magnet 107 is moved away from the cover 87 when the button of the switch 108 is depressed. The positioning of all the parts is such that the magnetic washer 94 attracts the magnet 107 when the diaphragm 86 is forced to the left in FIG. 2, thereby, opening switch 108. When the diaphragm 86 is moved to the right the magnetic washer 94 moves to the right and no longer attracts the magnet 107, whereby, the spring 109 pulls the arm 105 clockwise to close the switch 108.

The second water flow regulating device 62 attached to the housing 72 of the pressure responsive device 61 by the adapter 82 is substantially similar to the first water flow regulating device 60 with a centrally located axially aligned tubular member 115 mounted by a flange 116 held in a union 117. In general the passage through the tubular member 115 will be somewhat larger than the passage 77 through the tubular member 75. Basically the second water flow regulating device 62 is positioned in the line to provide a pressure chamber between it and the first water flow regulating device 60 so that a pressure responsive device 61 can be utilized therebetween. By providing a chamber with a substantial pressure therein the pressure responsive device 61 can be more accurate and, therefore, small pressure changes will have more effect thereon.

The operation of the pressure responsive device 61 is as follows. Water flowing through passageway 77 in the regulating device 60 is limited to a desired amount or rate of flow by the size of the opening. The water fills the entire chamber between the tubular member 75 and the tubular member 115 in the second regulating device 62. Since the second regulating device 62 restricts the flow of water somewhat, the water between the two regulating devices 60 and 62 is under a pressure. The water in the pressure responsive device 61 presses against the right side of the diaphragm 86 forcing it to the left, against the bias of the spring 100. Assuming the water flow through the system is at the desired level, the pressure on the diaphragm 86 is sufficient to move the magnetic washer 94 adjacent the cover 87. The magnet 107 is attracted to the magnetic washer 94 and moves the arm 105 counterclockwise, thereby opening the switch 108. If the flow of water through the passageway 77 is decreased or stopped the water pressure between the two regulating devices 60 and 62 decreases and the pressure on the diaphragm 86 is decreased. Because of the decrease in water pressure the spring 100 can move the diaphragm 86 to the right, which moves the magnetic washer 94 to the right. The attraction between magnet 107 and the magnetic washer 94 is decreased and spring 109 rotates the arm 105 clockwise, thereby closing the switch 108. Since the passageway 77 generally has a smaller diameter than the passageway in the tubular member 115, the first regulating device 60 will be obstructed more quickly by excessive impurities in the water and a lower pressure will prevail on the pressure responsive device 61. Thus, although it might be desirable in some cases to indicate a rise or a drop in pressure, in general a pressure responsive device 61 which indicates only a drop in water pressure is sufficient to warn of impending difficulties.

Figure 5:
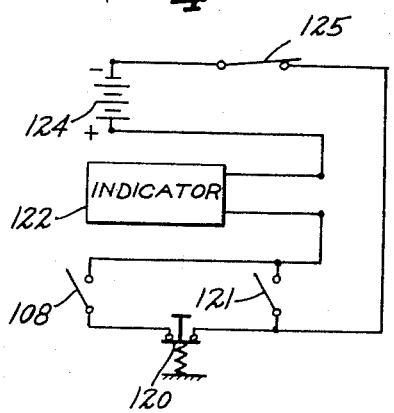
FIG. 5 is a schematic view of the warning system for the water circulating system illustrated in FIG. 1.

FIG. 5 illustrates a typical indicating circuit in which the switch 108 of the pressure responsive device 61 is connected. In the circuit of FIG. 5 the switch 108 is connected in series with a manual switch 120, which may be a push button switch or the like, and both switches 108 and 120 are connected in parallel with a second switch 121. Switch 121 is a switch similar to 108 which is located in the regulating and warning device 15. One side of the switch 121 is connected to one side of an indicator 122, which may be a buzzer, light, or the like. A power source, which in this embodiment is a battery 124, is connected in series with a power switch 125 and this circuit is connected between the other side of the indicator 122 and the other side of the switch 121. Thus, with the power switch 125 and the push button switch 120 normally closed whenever one of switches 108 or 121 closes the indicator 122 is energized. In the operation of the present device when the water flow through either of the regulating and warning devices 15 or 45 has dropped below a predetermined value the water pressure on the pressure responsive device is lowered and the switch 121 or 108, respectively, closes. To determine whether the switch 108 or the switch 121 has closed an operator need only depress the push button 120, whereby if the indicator 122 is still energized the operator will know that switch 121 is closed and if the indicator 122 is not energized the operator will know that the switch 108 is closed.

Thus, through use of the present regulating and warning device the flow of water through a conduit can be accurately regulated to a desired amount and, because of the configuration of the regulating device, the danger of foreign particles accumulating in the restriction and further reducing or completely preventing water flow is greatly diminished. In addition, a warning device is included which accurately indicates a reduction in the flow of water pressure so that an operator will be aware of impending difficulties long before they actually become troublesome. Thus, minor deposits of foreign materials can be detected and removed before they actually stop the flow of water and cause a major shutdown of the system.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. In a water circulating system for a refrigeration unit a water flow regulating device comprising:
    (a) a conduit operatively connected in said circulating system;
    (b) an elongated generally tubular member with an inner surface generally parallel with the longitudinal axis thereof forming a passageway therein for restricting the flow of water therethrough to a desired amount, said passageway being at least as long as the diameter thereof, said tubular member having an outwardly flared inlet and an outlet which is beveled so the inner surface tapers outwardly to intersect the outer surface;
    (c) means rigidly mounting said tubular member within said conduit so the longitudinal axes thereof are substantially parallel; and
    (d) said mounting means being further characterized by completely closing said conduit except for the passageway through said tubular member.

2. In a water circulating system for a refrigeration unit a water flow regulating device substantially as set forth in claim 1 having in addition means responsive to water flow associated therewith for providing an indication of a reduction in water flow through said water flow regulating device.

3. In a water circulating system for a refrigeration unit a water flow regulating device substantially as set forth in claim 1 wherein a second tubular member is mounted within the conduits similar to the first tubular member and axially spaced from the first tubular member to form a chamber therebetween, said chamber having pressure responsive means associated therewith for indicating a reduction in water flow through either of said tubular members.

4. In a water circulating system for a refrigeration unit a water flow regulating device substantially as set forth in claim 1 wherein the tubular member is exchangeable so that the size of the passageway can be varied.

5. In a water circulating system for a refrigeration unit including a water evaporator, conduit means for bleeding a portion of the water and the impurities therein to a drain and apparatus for replenishing lost water in the system a warning and water flow regulating system comprising:
    (a) first and second water flow regulating devices each including a portion of conduit, first and second elongated generally tubular members having a passageway therein for restricting the flow of water therethrough to a desired amount, said tubular members being further characterized by each having an outwardly flared inlet and an outlet which is beveled so the inner surface tapers outwardly to join the outer surface, means rigidly mounting said tubular members within said conduit so the longitudinal axes thereof are substantially parallel and axially spaced apart to form a chamber therebetween, said mounting means being further characterized by completely closing said conduit around each of said tubular members except for the passageways therein, and pressure responsive means communicated with said chamber;
    (b) said first flow regulating device being mounted in said conduit means so the portion of water bleeding to the drain flows therethrough and is regulated thereby and said second flow regulating device being mounted in said apparatus for replenishing lost water so all incoming water flows therethrough and is regulated thereby; and
    (c) indicating means operatively attached to said pressure responsive means in said first and second flow regulating devices for indicating when the amount of bleeding or replenishing flow is diminished.

References Cited

UNITED STATES PATENTS

| | | | |
|---|---|---|---|
| 752,175 | 2/1904 | Monnier | 138—44 |
| 1,922,656 | 8/1933 | Berdon | 138—44 XR |
| 2,229,119 | 1/1941 | Nichols et al. | |
| 2,676,470 | 4/1954 | Streitz | 138—44 XR |
| 3,093,716 | 6/1963 | Horowitz | 137—557 XR |
| 3,140,726 | 7/1964 | Arenhold | 137—557 |

HENRY T. KLINKSIEK, *Primary Examiner.*

U.S. Cl. X.R.

138—44; 285—142